US012738280B1

(12) United States Patent
Sekine et al.

(10) Patent No.: US 12,738,280 B1

(45) Date of Patent: Sep. 15, 2026

(54) INFORMATION PROCESSING SYSTEM, COMPUTER-READABLE STORAGE MEDIA, AND COMPUTER-IMPLEMENTED METHOD

(71) Applicant: Nintendo Co., Ltd., Kyoto (JP)

(72) Inventors: Ayumu Sekine, Kyoto (JP); Tatsuya Matsumoto, Kyoto (JP); Hironori Kakemizu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 19/371,798

(22) Filed: Oct. 28, 2025

(30) Foreign Application Priority Data

May 30, 2025 (JP) ................................ 2025-091348
Jun. 3, 2025 (JP) ................................ 2025-092706

(51) Int. Cl.
*G10L 19/008* (2013.01)
*A63F 13/54* (2014.01)

(52) U.S. Cl.
CPC ............ *G10L 19/008* (2013.01); *A63F 13/54* (2014.09)

(58) Field of Classification Search
CPC ....... G10L 19/008; G10L 19/18; G10L 19/20; A63F 13/54
See application file for complete search history.

(56) References Cited

U.S. PATENT DOCUMENTS 4,674,037 A * 6/1987 Funabashi ............ G06F 15/167 710/36
2002/0037160 A1 3/2002 Locket et al.
2003/0031467 A1 2/2003 Ando et al.
2004/0001694 A1 1/2004 Evans et al.
2005/0035971 A1 2/2005 Jung et al.
2005/0222841 A1 10/2005 McDowell
2006/0088286 A1 4/2006 Shibata et al.
2006/0158969 A1 7/2006 Hamada et al.
2008/0075175 A1 3/2008 Takahashi et al.
(Continued)

FOREIGN PATENT DOCUMENTS

JP 2002-171490 6/2002
JP 2003-84973 3/2003
(Continued)

OTHER PUBLICATIONS

Sekine et al., U.S. Appl. No. 19/378,065, filed Nov. 3, 2025.
(Continued)

*Primary Examiner* — Abul K Azad
(74) *Attorney, Agent, or Firm* — Nixon & Vanderhye PC

(57) ABSTRACT

An information processing system repeatedly generating a decoding request including a decoding source ID and a first buffer ID identifying a first buffer storing decodable data. In response to a decoding start instruction, the system obtains the generated decoding requests. For each obtained decoding requests, the system decodes the decodable data stored in the first buffer, stores the decoded data in a second buffer, and generates a decoding response including the decoding source ID included in the respective decoding request and a second buffer ID identifying the second buffer storing the decoded data. After completion of decoding for the obtained decoding requests, the system obtains the decoded data from the second buffer identified by the second buffer ID included in the decoding response corresponding to a given decoding source ID.

22 Claims, 7 Drawing Sheets

(56) References Cited

U.S. PATENT DOCUMENTS

| | | | | |
|---|---|---|---|---|
| 2010/0189418 | A1 | 7/2010 | Mizutani | |
| 2019/0122673 | A1* | 4/2019 | Rafii | H04H 60/31 |
| 2020/0014477 | A1* | 1/2020 | Someya | H04H 20/04 |
| 2021/0294525 | A1* | 9/2021 | Sumiyoshi | G06F 3/0604 |
| 2022/0107738 | A1 | 4/2022 | Ohba et al. | |
| 2023/0042934 | A1 | 2/2023 | Kakaiya et al. | |
| 2023/0405465 | A1 | 12/2023 | Furukawa | |

FOREIGN PATENT DOCUMENTS

| | | |
|---|---|---|
| JP | 2004-40791 | 2/2004 |
| JP | 2004-173091 | 6/2004 |
| JP | 2005-501485 | 1/2005 |
| JP | 2006-127080 | 5/2006 |
| JP | 2006-157868 | 6/2006 |
| JP | 2006-164327 | 6/2006 |
| JP | 2008-85616 | 4/2008 |
| JP | 2008-278511 | 11/2008 |
| JP | 2010-177795 | 8/2010 |
| JP | 2011-232766 | 11/2011 |
| JP | 2022-61450 | 4/2022 |
| JP | 2023-18655 | 2/2023 |
| JP | 2023166047 A | 11/2023 |

OTHER PUBLICATIONS

Mar. 12, 2026 Notice of Allowance issued in Japanese Patent Application No. 2025-092706, pp. 1-4 [English translation included].

Yasutaka Akizawa, Surprisingly 1000 times smoother than a CD! 24 bit/192 kHz from Raspberry Pi! Full-fledged debut!High-Resolution Linux Audio, Interface, Japan, CQ Publishing Co., Ltd., Jul. 29, 2014, vol. 40, No. 9, pp. 98 to 108.

* cited by examiner

FIG. 1 HARDWARE BLOCK DIAGRAM OF GAME DEVICE 1
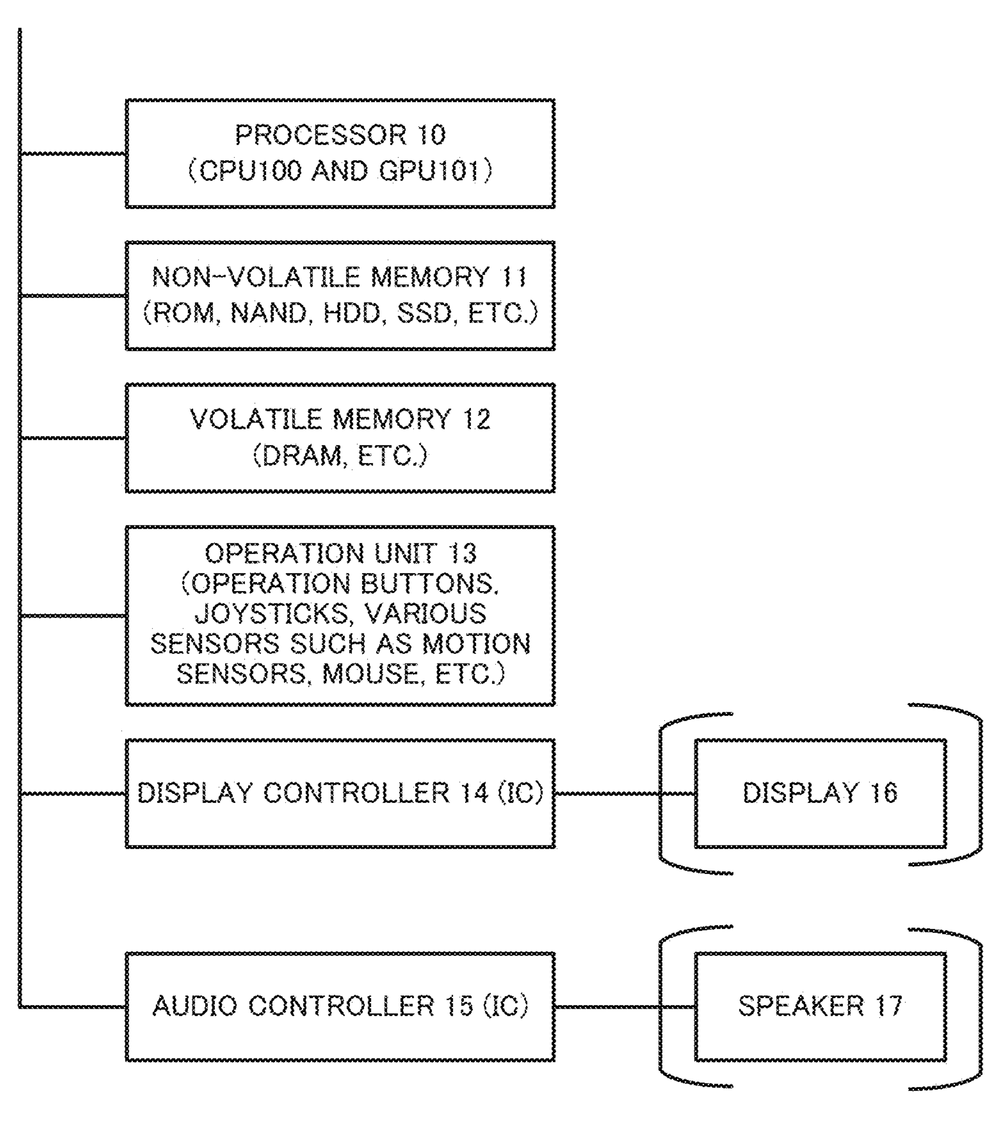

FIG. 2

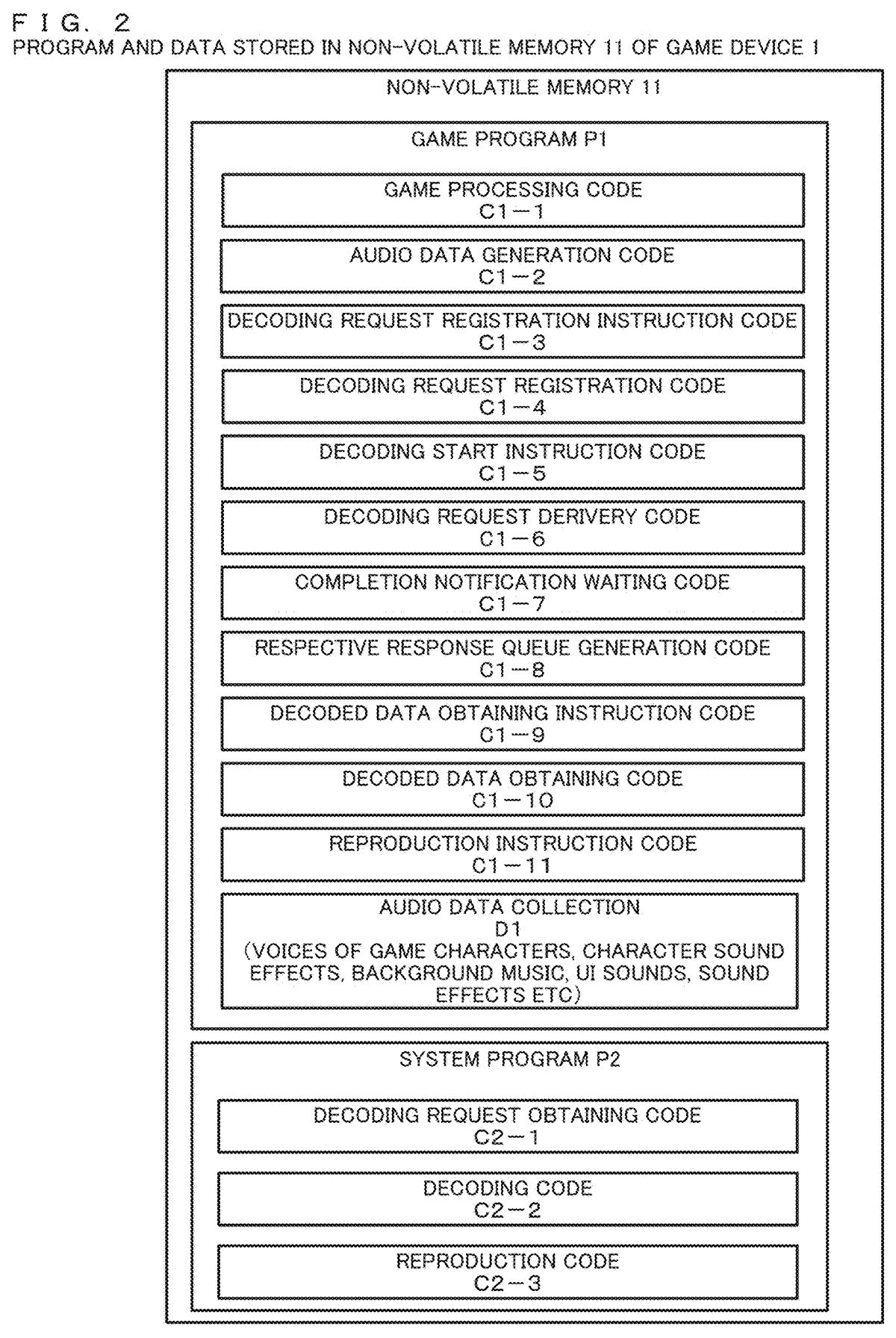

PROGRAM AND DATA STORED IN NON-VOLATILE MEMORY 11 OF GAME DEVICE 1

NON-VOLATILE MEMORY 11

GAME PROGRAM P1

GAME PROCESSING CODE C1-1

AUDIO DATA GENERATION CODE C1-2

DECODING REQUEST REGISTRATION INSTRUCTION CODE C1-3

DECODING REQUEST REGISTRATION CODE C1-4

DECODING START INSTRUCTION CODE C1-5

DECODING REQUEST DERIVERY CODE C1-6

COMPLETION NOTIFICATION WAITING CODE C1-7

RESPECTIVE RESPONSE QUEUE GENERATION CODE C1-8

DECODED DATA OBTAINING INSTRUCTION CODE C1-9

DECODED DATA OBTAINING CODE C1-10

REPRODUCTION INSTRUCTION CODE C1-11

AUDIO DATA COLLECTION D1 (VOICES OF GAME CHARACTERS, CHARACTER SOUND EFFECTS, BACKGROUND MUSIC, UI SOUNDS, SOUND EFFECTS ETC)

SYSTEM PROGRAM P2

DECODING REQUEST OBTAINING CODE C2-1

DECODING CODE C2-2

REPRODUCTION CODE C2-3

FIG. 3 AUDIO DATA COLLECTION D1

F I G. 4
DATA STORED IN VOLATILE MEMORY 12 OF GAME DEVICE 1 DURING PROGRAM EXECUTION
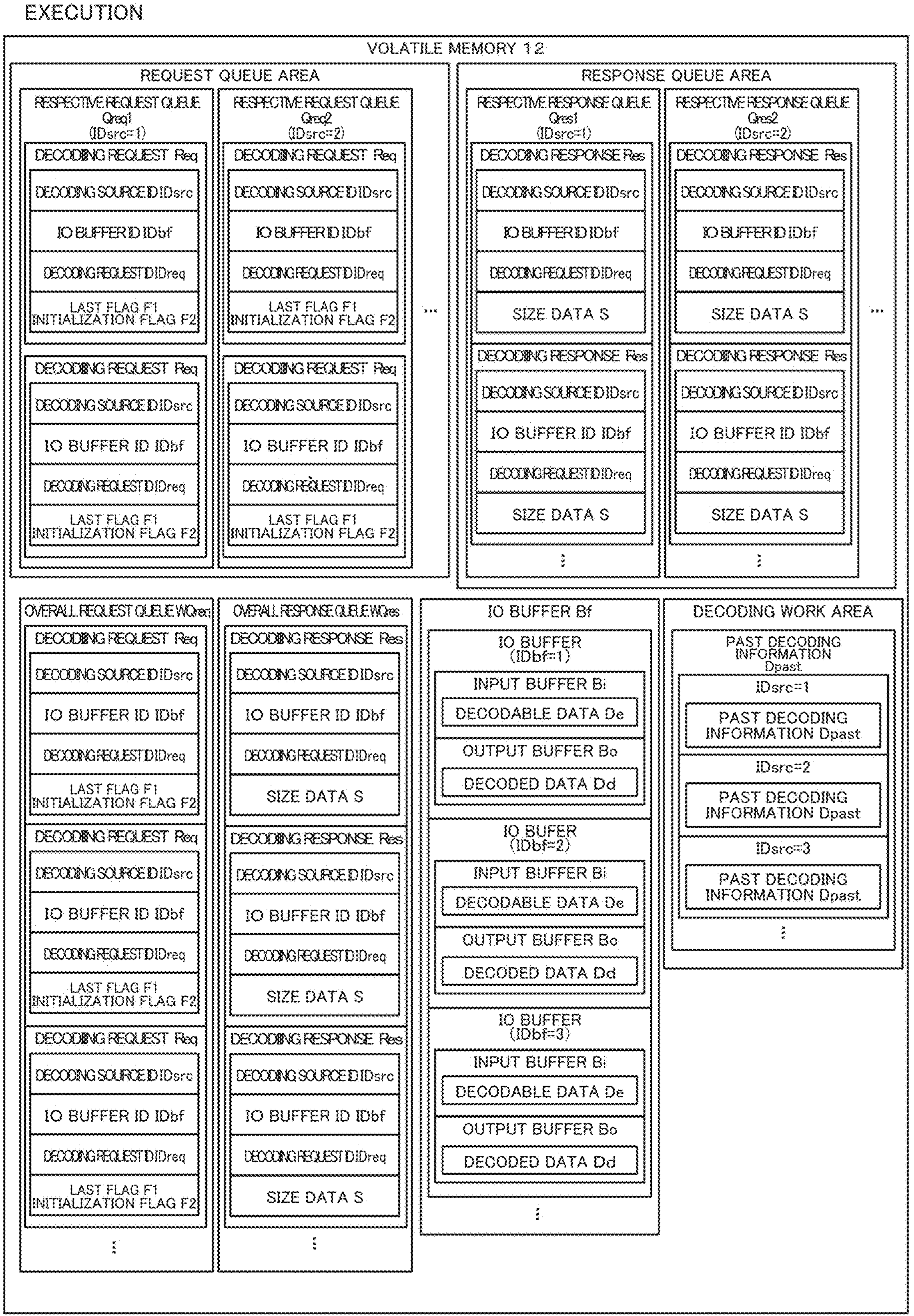

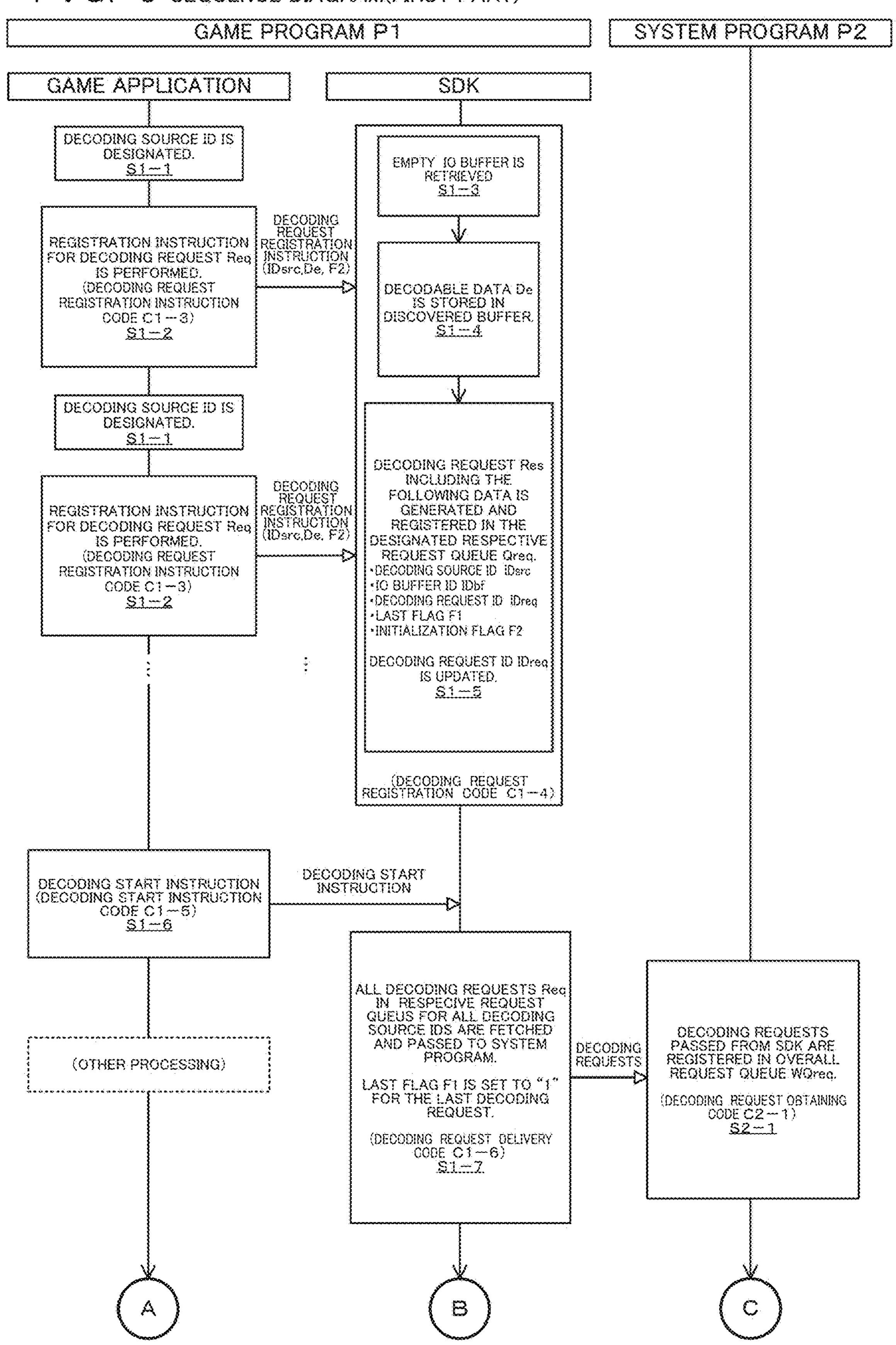
FIG. 5 SEQUENCE DIAGRAM(FIRST PART)
GAME PROGRAM P1
SYSTEM PROGRAM P2
GAME APPLICATION
SDK
DECODING SOURCE ID IS DESIGNATED. S1-1
EMPTY IO BUFFER IS RETRIEVED S1-3
REGISTRATION INSTRUCTION FOR DECODING REQUEST Req IS PERFORMED. (DECODING REQUEST REGISTRATION INSTRUCTION CODE C1-3) S1-2
DECODING REQUEST REGISTRATION INSTRUCTION (IDsrc,De, F2)
DECODABLE DATA De IS STORED IN DISCOVERED BUFFER. S1-4
DECODING SOURCE ID IS DESIGNATED. S1-1
REGISTRATION INSTRUCTION FOR DECODING REQUEST Req IS PERFORMED. (DECODING REQUEST REGISTRATION INSTRUCTION CODE C1-3) S1-2
DECODING REQUEST REGISTRATION INSTRUCTION (IDsrc,De, F2)
DECODING REQUEST Res INCLUDING THE FOLLOWING DATA IS GENERATED AND REGISTERED IN THE DESIGNATED RESPECTIVE REQUEST QUEUE Qreq.
·DECODING SOURCE ID IDsrc
·IO BUFFER ID IDbf
·DECODING REQUEST ID IDreq
·LAST FLAG F1
·INITIALIZATION FLAG F2
DECODING REQUEST ID IDreq IS UPDATED. S1-5
(DECODING REQUEST REGISTRATION CODE C1-4)
DECODING START INSTRUCTION (DECODING START INSTRUCTION CODE C1-5) S1-6
DECODING START INSTRUCTION
ALL DECODING REQUESTS Req IN RESPECIVE REQUEST QUEUS FOR ALL DECODING SOURCE IDS ARE FETCHED AND PASSED TO SYSTEM PROGRAM.
LAST FLAG F1 IS SET TO "1" FOR THE LAST DECODING REQUEST.
(DECODING REQUEST DELIVERY CODE C1-6) S1-7
DECODING REQUESTS
DECODING REQUESTS PASSED FROM SDK ARE REGISTERED IN OVERALL REQUEST QUEUE WQreq.
(DECODING REQUEST OBTAINING CODE C2-1) S2-1
(OTHER PROCESSING)
A
B
C

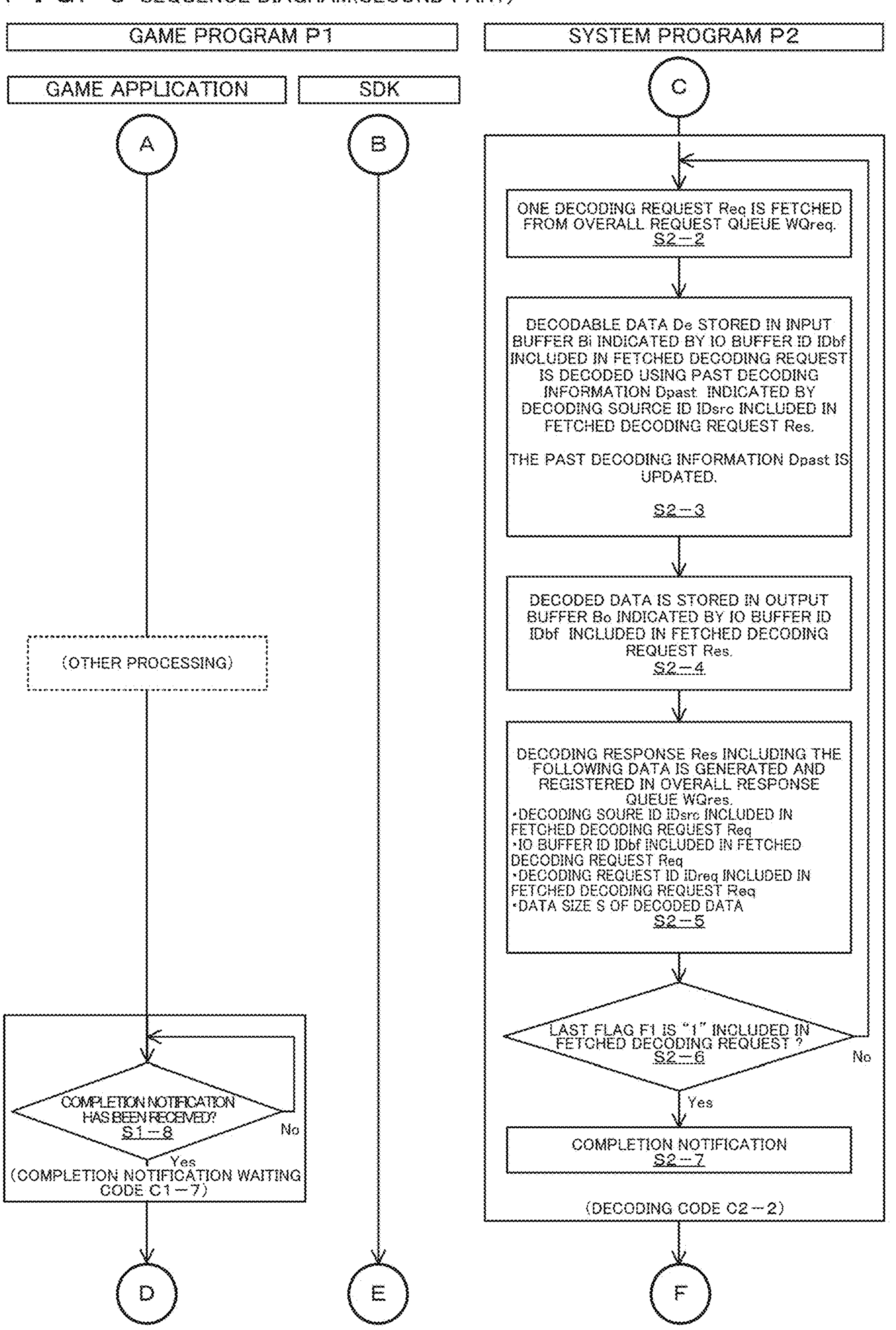
FIG. 6 SEQUENCE DIAGRAM(SECOND PART)
GAME PROGRAM P1
SYSTEM PROGRAM P2
GAME APPLICATION
SDK
C
A
B
ONE DECODING REQUEST Req IS FETCHED FROM OVERALL REQUEST QUEUE WQreq.
S2-2
DECODABLE DATA De STORED IN INPUT BUFFER Bi INDICATED BY IO BUFFER ID IDbf INCLUDED IN FETCHED DECODING REQUEST IS DECODED USING PAST DECODING INFORMATION Dpast INDICATED BY DECODING SOURCE ID IDsrc INCLUDED IN FETCHED DECODING REQUEST Res.
THE PAST DECODING INFORMATION Dpast IS UPDATED.
S2-3
DECODED DATA IS STORED IN OUTPUT BUFFER Bo INDICATED BY IO BUFFER ID IDbf INCLUDED IN FETCHED DECODING REQUEST Res.
S2-4
(OTHER PROCESSING)
DECODING RESPONSE Res INCLUDING THE FOLLOWING DATA IS GENERATED AND REGISTERED IN OVERALL RESPONSE QUEUE WQres.
·DECODING SOURE ID IDsrc INCLUDED IN FETCHED DECODING REQUEST Req
·IO BUFFER ID IDbf INCLUDED IN FETCHED DECODING REQUEST Req
·DECODING REQUEST ID IDreq INCLUDED IN FETCHED DECODING REQUEST Req
·DATA SIZE S OF DECODED DATA
S2-5
LAST FLAG F1 IS "1" INCLUDED IN FETCHED DECODING REQUEST ?
S2-6
No
Yes
COMPLETION NOTIFICATION
S2-7
(DECODING CODE C2-2)
COMPLETION NOTIFICATION HAS BEEN RECEIVED?
S1-8
No
Yes
(COMPLETION NOTIFICATION WAITING CODE C1-7)
D
E
F

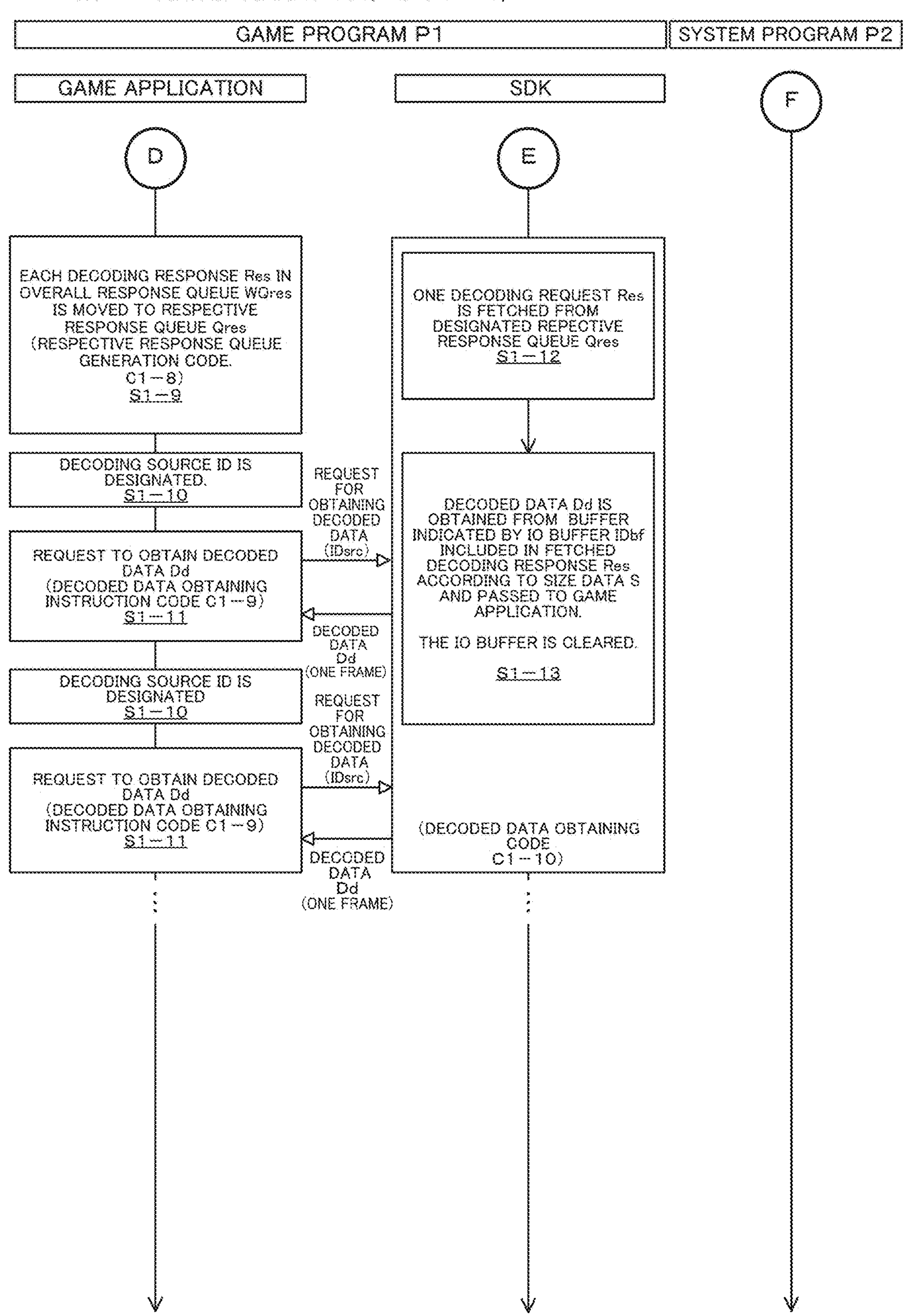
FIG. 7 SEQUENCE DIAGRAM(THIRD PART)
GAME PROGRAM P1
SYSTEM PROGRAM P2
GAME APPLICATION
SDK
D
E
F
EACH DECODING RESPONSE Res IN OVERALL RESPONSE QUEUE WQres IS MOVED TO RESPECTIVE RESPONSE QUEUE Qres (RESPECTIVE RESPONSE QUEUE GENERATION CODE. C1-8) S1-9
ONE DECODING REQUEST Res IS FETCHED FROM DESIGNATED REPECTIVE RESPONSE QUEUE Qres S1-12
DECODING SOURCE ID IS DESIGNATED. S1-10
REQUEST FOR OBTAINING DECODED DATA (IDsrc)
REQUEST TO OBTAIN DECODED DATA Dd (DECODED DATA OBTAINING INSTRUCTION CODE C1-9) S1-11
DECODED DATA Dd IS OBTAINED FROM BUFFER INDICATED BY IO BUFFER IDbf INCLUDED IN FETCHED DECODING RESPONSE Res ACCORDING TO SIZE DATA S AND PASSED TO GAME APPLICATION.
THE IO BUFFER IS CLEARED.
S1-13
DECODED DATA Dd (ONE FRAME)
DECODING SOURCE ID IS DESIGNATED S1-10
REQUEST FOR OBTAINING DECODED DATA (IDsrc)
REQUEST TO OBTAIN DECODED DATA Dd (DECODED DATA OBTAINING INSTRUCTION CODE C1-9) S1-11
(DECODED DATA OBTAINING CODE C1-10)
DECODED DATA Dd (ONE FRAME)

INFORMATION PROCESSING SYSTEM, COMPUTER-READABLE STORAGE MEDIA, AND COMPUTER-IMPLEMENTED METHOD

CROSS REFERENCE TO RELATED APPLICATION

This application claims priority to Japanese Patent Application No. 2025-091348, filed on May 30, 2025, and Japanese Patent Application No. 2025-092706, filed on Jun. 3, 2025, the entire contents of which are incorporated herein by reference.

FIELD

The present disclosure relates to information processing system, computer-readable storage media, and computer-implemented method.

BACKGROUND AND SUMMARY

Conventionally, there is a system for decoding. For example, there is a game system for performing audio reproduction by decoding encoded audio data. There is room for improvement in how to perform decoding.

In one example embodiment, an information processing system may comprise one or more processors and one or more memories storing instructions executable by the one or more processors to perform operations. The operations may comprise: repeatedly generating a decoding request including a decoding source ID and a first buffer ID identifying a first buffer storing decodable data; in response to a decoding start instruction, obtaining the repeatedly-generated decoding requests; for each of the obtained decoding requests, decoding the decodable data stored in the first buffer identified by the first buffer ID included in the respective decoding request, storing the decoded data in a second buffer, and generating a decoding response including the decoding source ID included in the respective decoding request and a second buffer ID identifying the second buffer storing the decoded data; and after completion of decoding for the obtained decoding requests, obtaining, for a given decoding source ID, the decoded data from the second buffer identified by the second buffer ID included in the decoding response corresponding to the given decoding source ID.

According to the configuration above, data from multiple sources can be decoded together.

In one example embodiment, first data may be further included in the decoding request lastly generated before the decoding start instruction, and the operations may further comprise determining that the decoding for the obtained decoding requests has been completed with reference to the first data.

In one example embodiment, the operations may further comprise after the decoding start instruction, waiting for the completion of decoding for the obtained decoding requests, and the code for the decoding start instruction and the code for the waiting may be independent from each other.

In one example embodiment, the operations may further comprise ending the waiting in response to the completion, and the ending of the waiting may be executable regardless of whether the completion occurs before or after the start of the waiting.

In one example embodiment, the operations may further comprise storing past decoding information for each decoding source ID, and the decoding may be configured to operate using the past decoding information for the decoding source ID included in the respective decoding requests.

In one example embodiment, second data indicating an initialization instruction for initializing the past decoding information may be further included in the decoding request, and the operations may further comprise when the decoding request includes the second data indicating the initialization instruction, initializing the past decoding information for the decoding source ID included in the decoding request before or after decoding the decodable data of the decoding request.

In one example embodiment, the initializing the past decoding information may be performed before decoding the decodable data.

In one example embodiment, the operations may further comprise sorting the repeatedly-generated decoding requests by the decoding source ID included in the respective decoding requests before decoding the decodable data.

In one example embodiment, the operations may further comprise searching for an empty buffer for each generation of the decoding request, and the decodable data may be stored in a buffer located by the searching.

In one example embodiment, size data indicating the size of the decoded data may be further included in the decoding response, and the obtaining of the decoded data may be configured to operate based on the size data included in the respective decoding response.

In one example embodiment, in the storing the decodable data, one unit of multiple decodable data may be stored in the first buffer; in the storing the decoded data, one unit of decoded data may be stored in the second buffer; and in the obtaining of the decoded data, the one unit of decoded data stored in the second buffer may be obtained upon one obtaining request.

In one example embodiment, the first buffer and the second buffer may be a set of buffers, which are identified by the same ID; and in the storing the second buffer may be another buffer of the set of buffers identified by the first buffer ID included in the respective decoding request.

In one example embodiment, one or more non-transitory computer-readable storage media may store instructions executable by one or more processors to perform operations. The operations may comprise: obtaining repeatedly-generated decoding requests each including a decoding source ID and a first buffer ID identifying a first buffer storing decodable data in response to a decoding start instruction; for each of the obtained decoding requests, decoding the decodable data stored in the first buffer identified by the first buffer ID included in the respective decoding request, storing the decoded data in a second buffer, and generating a decoding response including the decoding source ID included in the respective decoding request and a second buffer ID identifying a second buffer storing the decoded data; determining the decoding has been completed for the obtained decoding requests; and notifying the completion of decoding for the obtained decoding requests based on the determining.

In one example embodiment, the determination of the completion may be configured to operate with reference to first data indicating the last decoding request among the obtained decoding requests included in the decoding requests.

In one example embodiment, the operations may further comprise storing past decoding information for each decoding source ID, and the decoding may be configured to operate using the past decoding information for the decoding source ID included in the respective decoding requests.

In one example embodiment, the operations may further comprise initializing the past decoding information for the decoding source ID included in the decoding request before or after decoding the decodable data, based on an initialization instruction included in the decoding request.

In one example embodiment, the initialization of the past decoding information may be performed before decoding the decodable data.

In one example embodiment, the operations may further comprise sorting the obtained decoding requests by the decoding source ID included in the respective decoding requests before decoding of the decodable data.

In one example embodiment, size data indicating the size of the decoded data may be further included in the respective decoding responses.

In one example embodiment, in the storing of the decoded data, the second buffer may be a buffer of a set of buffers identified by the first buffer ID included in the respective decoding requests.

In one example embodiment, a computer-implemented method may comprise: repeatedly generating a decoding request including a decoding source ID and a first buffer ID identifying a first buffer storing decodable data; in response to a decoding start instruction, obtaining the repeatedly-generated decoding requests; for each of the obtained decoding requests, decoding the decodable data stored in the first buffer identified by the first buffer ID included in the respective decoding request, storing the decoded data in a second buffer, and generating a decoding response including the decoding source ID included in the respective decoding request and a second buffer ID identifying the second buffer storing the decoded data; and after completion of decoding for the obtained decoding requests, obtaining, for a given decoding source ID, the decoded data from the second buffer identified by the second buffer ID included in the decoding response corresponding to the given decoding source ID.

Any feature outlined above may be used in combination with any other feature or combination of features.

BRIEF DESCRIPTION OF THE DRAWINGS

FIG. 1 is a non-limiting example of a hardware block diagram of a game device 1;

FIG. 2 is a non-limiting example of programs and data stored in a non-volatile memory 11;

Figure 3:
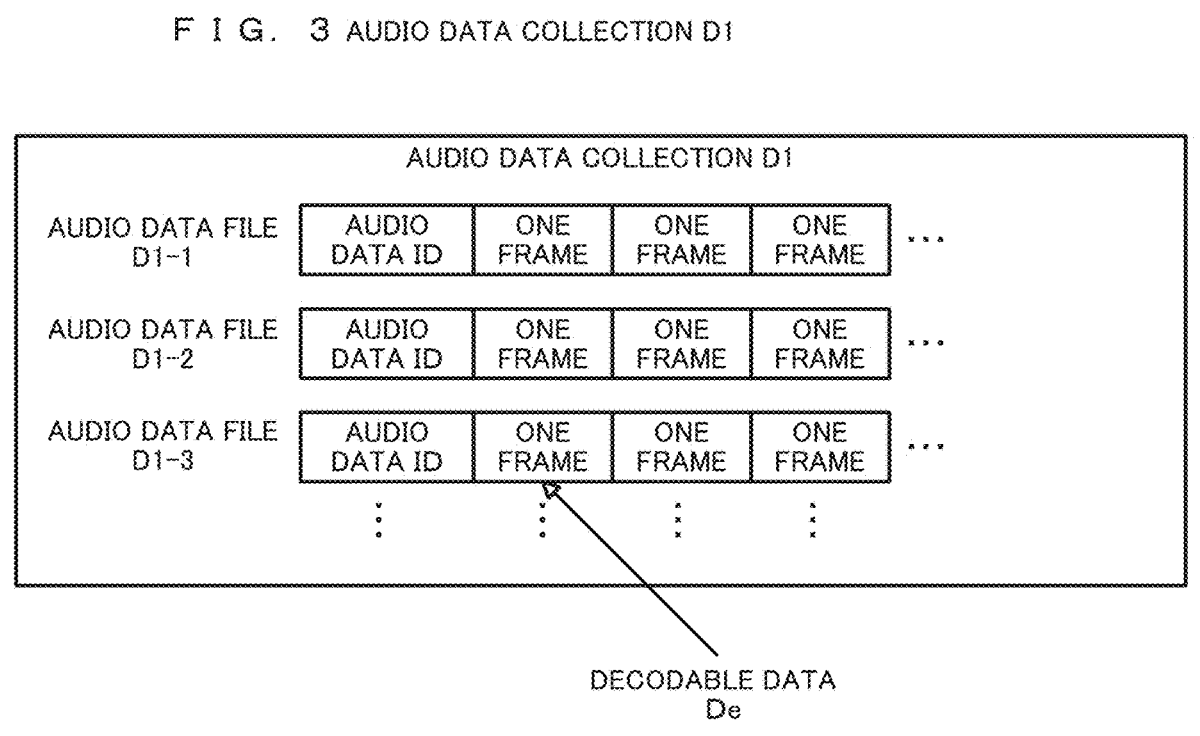

FIG. 3 is a non-limiting example of data included in audio data collection D1;

FIG. 4 is a non-limiting example of data stored in a volatile memory 12 during execution of programs;

FIG. 5 is a non-limiting example of a first part of a sequence diagram;

FIG. 6 is a non-limiting example of a second part of the sequence diagram;

FIG. 7 is a non-limiting example of a third part of the sequence diagram.

DETAILED DESCRIPTION OF NON-LIMITING EXAMPLE EMBODIMENTS

One embodiment will be explained below. FIG. 1 shows a non-limiting example of a hardware configuration of a game device 1. The game device 1 is an example of an information processing system. The game device 1 includes a processor 10, a non-volatile memory 11, a volatile memory 12, a controller interface 13 that receives data from one or more input devices, a display controller 14, an audio controller 15, etc. The game device 1 may include a plurality of processors. Some or all of the other components shown in FIG. 1 may be provided in singular or in plural (e.g., one or more memories may be provided for one or both of the non-volatile memory 11 and the volatile memory 12). The processor 10 may be a SoC (SYSTEM-ON-A-CHIP) including a CPU (Central Processing Unit) 100 and a GPU (Graphics Processing Unit) 101, etc. The CPU 100 and the GPU 101 may be separately provided. The non-volatile memory 11 may be any type non-volatile memory such as, for example, ROM, NAND flash memory, SSD (Solid State Drive), HDD (Hard Disc Drive), USB memory, NOR flash memory, MRAM (Magnetoresistive Random Access Memory), etc.; it may be an internal memory or a memory within a detachable memory card or cartridge. The volatile memory 12 may, for example, be DRAM, cache, register, or the like. The input devices connected to the controller interface 13 may include control buttons, joysticks, various sensors (motion sensors, etc.), a mouse, etc. The display controller 14 is a controller that outputs display data or signals to a display 16. The display 16 may be a built-in display in a portable game device, or an external monitor (TV, PC monitor, etc.) for a stationary game device. The audio controller 15 is a controller that outputs audio data or signals to a speaker 17. The display controller 14 and the audio controller 15 are a type of processor. The speaker 17 may be, for example, a built-in speaker in a portable game device, or an external speaker (TV speaker, etc.) for a stationary game device.

The game device 1 may be provided with a DSP (Digital Signal Processor). Such DSP may be used for decoding. The audio controller 15 may have decoder functionality provided thereto.

FIG. 2 shows a non-limiting example of programs and data stored in the non-volatile memory 11. A game program P1 and a system program P2 are stored in the non-volatile memory 11. The game program P1 and the system program P2 are executed by the CPU 100.

The game program P1 includes game processing code C1-1, audio data generation code C1-2, decoding request registration instruction code C1-3, decoding request registration code C1-4, decoding start instruction code C1-5, decoding request delivery code C1-6, completion notification waiting code C1-7, respective response queue generation code C1-8, decoded data obtaining instruction code C1-9, decoded data obtaining code C1-10, reproduction instruction code C1-11, and audio data collection D1, etc.

The game processing code C1-1 includes computer-executable instructions (which the CPU 100 can directly or indirectly execute through, for example, an interpreter or an emulator.) for performing various game processing related tasks such as movements or actions of game characters, collision determinations between game objects, and scenario progression based on input data from the input devices 13 etc. The audio data generation code C1-2 includes computer-executable instructions for reading audio data (contained in the audio data file) to be reproduced when an audio event occurs based on predetermined inputs, predetermined motions of game objects, collisions of objects, timing of effects, etc. A plurality of audio data files (D1-1, D1-2, D1-3 . . . ) corresponding to a plurality of audio events are stored in the non-volatile memory 11. The audio data files (D1-1, D1-2, D1-3 . . . ) are collectively referred to as audio data collection D1). Each audio data file D1-1, D1-2 or D1-3 . . . includes a plurality of frames of audio data. In this example embodiment, each frame of audio data is decodable data; that is, "decodable data" is "data to be decoded," so each frame of audio data is data to be decoded in this example embodiment. The audio data files (D1-1, D1-2, D1-3 . . . ) contains data encoded with a codec.

The decoding request registration instruction code C1-3 includes computer-executable instructions for providing an instruction to resister data that requests decoding of decodable data (e.g., one frame of the audio data). The data that requests decoding is hereinafter referred to as decoding request. By repeatedly executing this code before the start of decoding, it is possible to register a plurality of decoding requests for a plurality of decodable data (e.g., a plurality of frames in a certain audio data file), and/or to register a plurality of decoding requests for different audio data files by designating different decoding source IDs. The decoding source ID is for distinguishing data sources. Different decoding source IDs are assigned to different data sources such as different audio data files. The decoding source ID prevents decoding results and/or decoding processing of such different data sources from being mixed by designating different decoding source IDs. For example, when audio data file D1-1 and audio data file D1-2 are decoded collectively, a decoding source ID "1" may be designated to the decoding request of the audio data file D1-1, and a decoding source ID "2" may be designated to the decoding request of the audio data file D1-2. The decoding request registration instruction code C1-3 may include instructions for setting of a initialization flag as described later.

The decoding request registration code C1-4 includes computer-executable instructions for registering the decoding requests in a queue (hereinafter referred to as respective request queue) and stores decodable data (e.g. one frame of audio data) in an input buffer in response to the issuance of the instruction from the decoding request registration instruction code C1-3. The respective request queue is respectively provided for each decoding source ID. The decoding request of this example embodiment includes the following data:

- a decoding source ID as an identification for the source data to be decoded
- an IO buffer ID which indicates a buffer storing decodable data
- a decoding request ID
- a last flag
- an initialization flag.

The decoding request ID is, for example, data that is incremented every time a decoding request is generated, thereby identifying each decoding request. The last flag is data that indicates whether the associated decoding request is the last decoding request registered before a decoding start instruction (described later) is performed. The initialization flag is a flag for initializing past decoding information (described later) for each decoding source ID. As will be appreciated by those skilled in the art, a "queue" indicates a data structure where data is registered and used in a predetermined order, e.g., by the FIFO (FIRST IN FIRST OUT) method, LIFO (LAST IN FIRST OUT) method, priority queue method, etc. The registration of the decoding request to the respective request queue is not necessary. Additionally, the decoding request may be used without queue in at least some embodiments.

The decoding start instruction code C1-5 includes computer-executable instructions for causing decoding to start. In this example embodiments, a decoding source ID is not designated in the instruction from the decoding start instruction code C1-5 that causes the decoding to start.

The decoding request delivery code C1-6 includes computer-executable instructions for fetching all the decoding requests from all respective request queues for all decoding source IDs at the timing of the decoding start instruction, and for passing all the fetched data (collectively or sequentially) to system program P2. In one embodiment, all the decoding requests for all the decoding source IDs may be sorted by the decoding request ID after or before passing them to system program P2. The last flag is set to "1" for the last decoding request registered before the decoding start instruction. The last identification flags for the other decoding requests are set to "0". The last flag may be set to "1" for the last decoding request after the sort.

The completion notification waiting code C1-7 includes computer-executable instructions for waiting for a decoding completion notification (as described later).

The respective response queue generation code C1-8 includes computer-executable instructions for fetching, when the decoding completion notification is received, each decoding response registered in a queue (the overall response queue as described later) where all decoding responses (as described later) generated by decoding are registered, and for moving the fetched data to a queue for each decoding source ID (hereinafter referred to as respective response queue). The decoding response is metadata of decoding results as described later.

The decoded data obtaining instruction code C1-9 includes computer-executable instructions for causing decoded data (e.g., one frame of decoded data) to be obtained by designating a decoding source ID. By repeatedly executing this code, it is possible to obtain all of (e.g. all frames of) decoded data corresponding to the designated decoding source ID.

The decoded data obtaining code C1-10 includes computer-executable instructions for fetching the decoding response from the respective response queue for the designated decoding source ID in response to the instruction from the decoded data obtaining instruction code C1-9, and passing the decoded data (e.g. one frame of decoded data) stored in an output buffer designated by an IO buffer ID included in the fetched decoding response. In this implementation, the decoding response is fetched one-by-one from the respective response queue.

The reproduction instruction code C1-11 includes computer-executable instructions for performing a reproduction instruction based on the decoded data.

The system program P2 includes decoding request obtaining code C2-1, decoding code C2-2, reproduction code C2-3, etc.

The decoding request obtaining code C2-1 includes computer-executable instructions for obtaining all the decoding requests for all the decoding source IDs passed from the decoding request delivery codes C1-6. Then, the decoding request obtaining code C2-1 registers all the obtained decoding requests in a queue (hereinafter referred to as overall request queue, which is different from the respective request queue) in the same order as in the respective request queue in this example embodiment. That is, all the decoding requests for all the decoding source IDs is registered in the overall request queue.

Then, decoding by the decoding code C2-2 is started. The registration to the overall request queue is not necessary in some embodiments. The obtained decoding requests may be used directly or by storing them in an appropriate memory area without registering it them a queue. Before obtaining all the decoding requests, decoding processing may be performed every time one or a plurality of the decoding requests is/are obtained. Decoding processing may be performed by changing the order in which the decoding requests were passed from game program P1.

The decoding code C2-2 includes computer-executable instructions for decoding each of the decodable data based on each of the obtained decoding requests. Specifically, in certain example embodiments, (i) each decoding request is fetched one by one from the overall request queue, (ii) the decodable data designated by the fetched decoding request is decoded, and (iii) a decoding response, which is metadata of a decoding result of the decoding, is generated and registered in a queue (hereinafter referred to as overall response queue, which is different from the respective request queue or the overall request queue). In this example embodiment, the decoding response for each fetched decoding request includes the following data:

- the decoding source ID included in the fetched decoding request
- the IO buffer ID included in the fetched decoding request (the IO buffer ID storing the decoded data)
- the decoding request ID included in the fetched decoding request
- size data for the decoded data When decoding all the decodable data by all the obtained decoding requests, a decoding completion notification is issued.

Decoding processing may be performed by a hardware decoder in certain example embodiments.

The reproduction code C2-3 includes computer-executable instructions for causing the audio controller 15 to perform audio reproduction based on the decoded data in response to the instruction from the reproduction instruction code C1-11.

FIG. 4 shows a non-limiting example of data stored in a volatile memory 12 when each program described above is executed. an area for the respective request queues, an area for the overall request queue, an area for the respective response queues, and an area for the overall response queue are reserved in the volatile memory 12. Each queue area for each of the decoding source IDs is reserved in the area for the respective request queue area and the respective response queue area. The decoding requests or the decoding responses are stored in each queue area. An IO buffer area is reserved in the volatile memory 12. The IO buffer area has a plurality of IO buffer regions, and each of the IO buffer region includes an input buffer area for storing decodable data and an output buffer area for storing decoded data. The input buffer and output buffer are managed with the same identification data (IO buffer ID).

Additionally, a decoding work area is reserved in the volatile memory 12. The decoding work area stores past decoding information for each of the decoding source ID along with other information. The past decoding information is stored because the audio data files used in this example embodiment contains encoded data using a method that requires information (features, etc.) from the decoding of the past frame(s) of the decodable data. Specifically, the audio data files may contain encoded data by an Opus codec.

In FIG. 4, the various data structures have data elements including decoding request (Req), decoding source ID (IDsrc), IO buffer ID (IDbf), decoding request ID (IDreq), last flag (F1), initialization flag (F2), decoding response (Res), decoded data size(S), respective request queue (Qreq), respective response queue (Qres), overall request queue (WQreq), overall response queue (WQres), IO buffer (Bf), input buffer (Bi), output buffer (Bo), decodable data (De), decoded data (Dd), and past decoded information (Dpast).

FIG. 5 to FIG. 7 show a non-limiting example of a sequence of processing by the programs described above. When one of the audio data file is set to be reproduced, this sequence is repeatedly executed to decode each frame data included in the audio data file.

In FIG. 5 to FIG. 7, processing by executing the code of a game application program included in the game program P1 is shown on the left side, processing by executing the code of SDK (software development kit) included in the game program P1 is shown in the center, and processing by executing the code of the system program P2 is shown on the right side. The SDK is a software kit (e.g., programs or code) provided to game application developers. A developer of a game application can develop the game program P1 effectively by using functions provided by the software kit. The processing by the game application code and processing by the SDK code as shown in FIG. 5 to FIG. 7 are just an example. The game application may implement part or all of the SDK code. In that case, since some processing between the game application code and the SDK code is unnecessary, some codes shown in FIG. 5 to FIG. 7 may be unnecessary. For example, when the registering of the decoding request is performed by the game application program, the decoding request registration instruction code C1-3 is unnecessary. The same goes for the other instruction codes. Also, the system program P2 may implement part or all of the code of the game program P1, and the game program P1 may implement part or all of the system program P2.

When an audio event occurs, a corresponding audio data file (one of D1-1, D1-2, D1-3 and others) to be reproduced is generated. Specifically, such audio data file to be reproduced may be stored in a reproduction target area (not shown) of the volatile memory 12. When the audio data file to be reproduced is generated, a decoding source ID is designated based on the code of the game application (S1-1).

Next, a registration instruction for a decoding request Req for decodable data De in the audio data file (one frame data in the audio data file, one by one from the beginning) is performed based on the code of the game application (S1-2). Although not shown, the registration instruction for the decoding request Req in S1-2 includes an instruction for setting the initialization flag F2. The flag is instructed to be set to "on" (i) when performing a registration instruction to register a decoding request for a new audio data file, (ii) when performing a registration instruction to register a decoding request for the first frame De in the same audio data file again when performing loop reproduction of the same audio data file, or (iii) when changing the playback position while reproducing the same audio data file in this example embodiment. In other cases, the initialization flag F2 is instructed to be set to "off". The initialization flag F2 may be instructed to be set to "on" when performing a registration instruction to register a decoding request for the last frame of the audio data file instead of the first frame.

In response to the instruction from S1-2, an empty IO buffer Bf is retrieved based on the SDK code (S1-3). Next, the decodable data De designated by the instruction from S1-2 is stored in the input buffer Bi of the discovered IO buffer Bf (S1-4). Next, the decoding request Req is generated and registered in the respective request queue Qreq for the decoding source ID that was designated by the instruction from S1-2. The decoding request Req includes the decoding source ID (IDsrc) for the designated decoding source ID, the IO buffer ID (IDbf) storing the decodable data De, and the decoding request ID (IDreq), the last flag F1 and the initiation flag F2. At this point, the last flag F1 is set to "0". The initialization flag F2 is set according to the instruction from S1-2. Then, the decoding request ID (IDreq) is incremented (S1-5).

Next, the decoding start instruction is performed based on the code of the game application program (S1-6). The processing of S1-1 and S1-2 is repeatedly performed before the decoding start instruction is performed, and the processing from S1-3 to S1-5 may be repeatedly performed accordingly. S1-1 and S1-2 can be repeatedly performed by the game application program. A game application developer can arbitrarily decide the number of repetitions before the decoding start instruction is performed. Game application developers can decide how many decoding requests are registered (how many frames in one audio data file are to be collectively decoded) and whether decoding requests for different decoding sources are registered. The decoding request registrations for the same decoding source may be performed multiple times before the decoding start instruction for one audio data file (e.g. D1-1). The decoding request registrations for different decoding sources may be performed before the decoding start instruction in order to decode multiple audio data files (e.g. D1-1 and D1-2) collectively. Both may be performed. The designation of the decoding source ID (S1-1) does not need to be performed each time the registration instruction of the decoding request is performed. In this case, a decoding request may be made using the already designated decoding source ID.

When registrations of multiple decoding requests are performed for one audio data file (e.g. D1-1) before the decoding start instruction, that is, when the same decoding source ID is repeatedly designated in the designation of the decoding source ID in S1-1, a plurality of decoding requests Req for multiple decodable data (e.g. multiple frame of data) De in an audio data file are registered in a respective request queue Qreq for the designated decoding source ID. Also, when the registrations of multiple decoding requests are performed for multiple audio data files (e.g. D1-1 and D1-2) before the decoding start instruction, that is, when different decoding source IDs are designated in the designation of the decoding source ID in S1-1, decoding requests for different decoding source IDs are registered in the corresponding respective request queues Qreq. The decoding start instruction does not designate a decoding source ID in this example embodiment. That is, the decoding start instruction instructs the start of decoding for all the decoding requests for all the decoding source IDs registered before the decoding start instruction.

After the decoding start instruction, a wait process of waiting for a decoding completion notification is performed at an arbitrary timing (S1-8). Game application developers can decide the timing (whether the wait process starts just after the decoding start instruction or whether the wait process starts after another some other processing is performed) by the code of the game application program. Some processing may be performed after the decoding start instruction is performed and before the waiting processing starts. In this example embodiment, the code for decoding start instruction and the code for the wait process are independent from each other in the sense that the codes can be separated in the source or program code. For example, the code for the decoding start instruction and the code for the wait process can be provided in different functions, libraries, API calls, etc. It is not necessary to wait for the decoding completion immediately after the decoding start instruction is performed. In this way, some other processing can be performed before starting the wait process.

When the instruction to start decoding is performed, all decoding requests Req in the respective request queues Qreq for all the decoding source IDs are fetched. That is, all the decoding requests registered before the instruction to start decoding are fetched, or in other words, all the decoding requests in the queues at the timing of the start instruction are fetched. Then, all the fetched data is passed to the system program P2 based on the SDK code (S1-7). All the decoding requests Req for all the decoding source IDs may be sorted by the respective decoding request ID (IDreq) so that the registration order of the decoding requests can be known by the system program P2. The last flag F1 of the decoding request is set to "1" when the decoding request ID (IDreq) indicates that this is the last data registered before the decoding start instruction. The fetched decoding requests Req may be collectively passed (such as in a list format) to the system program P2, may be passed one by one, or may be passed part at a time (e.g., in batch). Sorting the decoding requests Req by the respective decoding request ID (IDreq) before the delivery is not necessary. The decoding requests Req may be sorted by the respective decoding source ID before (or after) passing them to the system program P2, or they may be passed to the system program P2 without performing any sorting.

When the decoding requests Req are passed to the system program P2, processing to register the decoding requests Req in the overall request queue WQreq is performed based on the code of the system program P2 (S2-1). In this example embodiment, the passed decoding requests Req are registered in the overall request queue WQreq in the order they are passed. That is, in this example embodiment, all decoding requests Req in the respective request queue Qreq for all decoding source IDs are registered in the overall request queue WQreq in the order of the decoding requests. It is not necessary to process the decoding request in the order in which the decoding request occurred. The order in the overall request queue WQres is not essential. For example, the decoding requests Req may be split or sorted by each decoding source ID. The decoding requests Req may be registered in the overall request queue WQreq in the order in which the decoding requests occurred as far as a certain decoding source ID is concerned. When encoding is performed by a method that requires past decoding information (features, etc.) of the past decoding on the past frame(s), it is necessary to maintain the order of the decoding requests within each decoding source ID. When the sort described above is performed, the decoding request whose the last flag F1 is set to "1" may be changed to the last decoding request after the sort.

Then, decoding processing is performed based on the code of the system program P2. In the decoding processing, one of the decoding requests Req is fetched from the overall request queue WQres (S2-2). In S2-2, when the initialization flag F2 included in the fetched decoding request Req indicates "on", the past decoding information Dpast for the decoding source ID indicated by the decoding source ID (IDsrc) included in the fetched decoding request Req is initialized. As described above, the initialization flag F2 may be set to "on" for the decoding request for the last frame in the audio data file. In the case, the initialization of the past decoding information Dpast may be performed at the last frame. Meanwhile it is easy to deal with a sudden change in a position to be reproduced in an audio data file if the initialization of the past decoding information Dpast is performed before decoding.

Next, the decodable data De stored in an input buffer Bi indicated by the IO buffer ID (IDbf) included in the fetched decoding request Req is decoded. In this decoding, the past decoded information Dpast for the decoding source ID indicated by the decoding source ID (IDsrc) included in the fetched decoding request Req is used. Also, the past decoded information Dpast for the decoding source ID is updated (S2-3).

Next, the decoded data Dd obtained by the decoding is stored in an output buffer Bo indicated by the IO buffer ID (IDbf) included in the fetched decoding request Req (S2-4).

Next, a decoding response Res is generated and registered, such that the decoding response Res includes the following data in the overall response queue WQres (S2-5).

the decoding source ID (IDsrc) of the decoding source ID included in the fetched decoding request Req the IO buffer ID (IDbf) included in the fetched decoding request Req the decoding request ID (IDreq) included in the fetched decoding request Req Data size S of the decoded data The processing from S2-2 to S2-5 is performed until the decoding processing is completed for all the decoding requests passed from the game program P1 (S2-6). Thus, decoding of all the decodable data is performed regardless of the decoding source IDs. All the decoding responses Res regardless of decoding source IDs are registered in the overall response queue WQres. In this example embodiment, the decoding responses Res are registered in the overall response queue WQres in the order in which decoding was performed (in the order in which decoding results were obtained). When the decoding is performed in the order of decoding requests, decoding responses Res are registered in the overall response queue WQres in the order of the decoding requests. When multiple decoding processes are performed in parallel, as described later, there is a possibility that the order in which decoding starts and the order in which decoded results are obtained do not match. However, if decoding requests for the same decoding source ID are assigned to the same decoding processes out of such multiple decoding processes, the order in which decoding results are obtained is maintained and the decoding responses Res are registered in the overall response queue WQres in the order of the decoding requests as far as a certain decoding source ID is concerned. Similarly, when processing such as sorting the decoding requests Res by the decoding source ID before decoding is performed, the decoding responses Res are registered in the order in which the decoding requests occurred as far as a certain decoding source ID is concerned. There is no need for the decoding responses Res to be registered in the overall response queue WQres in the order in which the decoding requests occurred. However, in this example embodiment, as described later, the decoding response Res is retrieved from the respective response queue Qres by FIFO method, so it is advantageous that the decoding responses Res are registered in the order in which the decoding requests occurred at least for a certain decoding source ID.

When processing is completed for all the decoding requests passed from game program P1, a decoding completion notification is issued (S2-7). It may be determined that processing has been completed with respect to all the decoding requests passed from game program P1 when there is no data in the overall request queue WQreq. In this example embodiment, by referencing the last flag F1 included in the decoding request Req which was fetched and decoded, it may be determined that all the decodable data of all the decoding requests passed from game program P1 is completed when the last flag F1 is "1". In this example embodiment, it is possible to register a new decoding request after the decoding start instruction since other processing can be performed after the decoding start instruction as described above. Therefore, there is a possibility that a new decoding request registered after the decoding start instruction is included in the overall request queue WQreq. By referring to the last flag F1, it can be safely determined that processing has been completed for all the data registered at the time of the decoding start instruction.

As an option, multiple decoding processing may be performed in parallel by, for example, using multiple decoding cores. In this case, it may be determined that the processing has been completed for all the decoding requests at the time of the decoding start instruction by checking if the last flag F1 included in the fetched decoding request Req is "1" and in addition checking if the decoding request registered before the decoding request whose the last flag F1 is "1" have been completed (decoded) based on the decoding request ID (IDreq), for example, by checking if all the decoding responses registered before the decoding request whose the last flag F1 is "1" are generated and registered in the overall response queue WQres. Thus, it is possible to cope with such changes in the order in which decoding results are obtained in parallel decoding processing. When adopting a configuration where multiple decoding processing is performed in parallel, decoding requests which has the same decoding source ID may be assigned to the same decoding processing out of such multiple decoding processing.

The decoding completion notification may, for example, be issued by a method of notifying the kernel of the completion, by a method of storing a completion flag on a memory shared with the game application program so that the game application program can refer to it, by a method of API through which the game application program can get the completion information from the system program or the like. Ending the decoding completion waiting processing may be performed by a method of performing an exit process by an instruction from the kernel, it may be performed by a method by referring to the completion flag, it may be performed through the API or the like. Thus, regardless of whether the timing of the decoding completion notification is issued (S2-7) is before or after the start of the decoding completion waiting processing, the decoding completion waiting processing can end.

When the decoding completion notification is issued, the waiting process ends in the completion notification waiting processing (S1-8).

Next, processing is performed to fetch all the decoding responses Res from the overall response queue WQres based on the code of the game application program and move them to the respective response queues Qres for each of the decoding source ID while maintaining the order in the overall response queue WQres in this example embodiment (S1-9). Namely, processing is performed to divide the decoding responses Res registered in the overall response queue WQres into the respective response queues Qres for each decoding source ID.

Next, processing for designating a decoding source ID is performed based on the code of the game application program (S1-10). This designates the decoding source ID of the decoded data to be obtained.

Next, a request to obtain decoded data Dd is performed based on the code of the game application program (S1-11).

In response to the obtaining request, processing is performed to fetch one of the decoding response Res from the respective response queue Qres corresponding to the designated decoding source ID based on the SDK code (S1-12). Then, the decoded data Dd stored in the output buffer Bo indicated by the IO buffer ID (IDbf) included in the fetched decoding response Res is obtained according to the data size S included in the fetched decoding response Res and passed to the game application program. Then processing to empty the IO buffer is performed (S1-13). Then, the game application code obtains the decoded data Dd passed from SDK (S1-11).

By repeating the codes S1-10 and S1-11 with the game application code, it is possible to obtain all the decoded data Dd of all the decodable data De for which the decoding request has been registered for each decoding source ID. Similar to when the decoding request is registered, a decoding source ID does not need to be designated each time decoded data is obtained. Instead, the already designated decoding source ID may be used.

By repeating the sequence shown in FIG. 5 to FIG. 7, the game application program can obtain the decoded data for all frames included in the audio data file(s) to be reproduced.

The above is an explanation of this example embodiment.

In one example embodiment, an information processing system may comprise one or more processors and one or more memories storing instructions executable by the one or more processors to perform operations. The operations may comprise: requesting to decode a plurality of decodable data with decoding sources distinguished; in response to a decoding start instruction, decoding each of the requested decodable data; storing each decoded data with the decoding source distinguished; and obtaining the decoded data with designating the decoding source.

In one example embodiment, one or more non-transitory computer-readable storage media may store instructions executable by one or more processors to perform operations. The operations may comprise: obtaining decoding requests to decode a plurality of decodable data with decoding sources distinguished in response to a decoding start instruction, decoding each decodable data based on each obtained decoding request, and storing decoded data with the decoding source distinguished.

In one example embodiment, an information processing system may comprise one or more processors, and one or more memories storing instructions executable by the one or more processors to perform operations. The operations may comprise: generating decoding requests to decode decodable data each including a decoding source ID, obtaining the generated decoding requests regardless of the decoding source ID, decoding decodable data for each of the obtained decoding requests, storing each of the decoded data in association with the decoding source ID included in the respective decoding request, and obtaining the decoded data with designating the decoding ID.

In one example embodiment, one or more non-transitory computer-readable storage media may store computer-executable instructions to perform operations. The operations may comprise: obtaining decoding requests to decode decodable data including a decoding source ID regardless of the decoding ID of the respective decoding requests, decoding decodable data for each of the obtained decoding requests, and storing each of the decoded data in association with the decoding ID included in the respective decoding request.

Each of the decoding responses Res may be directly obtained from the overall response queue WQres. All or multiple decoding responses Res in the overall response queue WQres or the respective response queue Qres may be obtained at once with or without designating the decoding source ID, so that all or multiple decoded data Dd, or all or multiple decoded data Dd corresponding to a certain decoding source ID are obtained at once.

An input buffer and an output buffer may be separately provided, and may be managed with separate identification data. In this case, for example, the decoded data Dd may be stored in an empty buffer, and the IO buffer ID (IDbf) in the decoding response Res may be set to an identification data of the buffer storing the decoded data Dd.

When the wait state ends in the decoding completion waiting process, processing for obtaining decoded data may be performed automatically. The waiting processing for the decoding completion may be started automatically after the processing of the decoding start instruction.

The explanation of each element, such as "game device," "processor," "non-volatile memory," "volatile memory," "audio controller," each program described above, each code described above, each data described above (such as "decoding request", "decoding response," each identification data, etc.) in the explanation of the above is just an exemplary explanation of each element in an embodiment.

In the above embodiments, a queue is used to store the decoding requests and the decoding responses, but these data can be stored without using a queue, and data can be retrieved and used from a required location as appropriate. There is no need to maintain the order in which the decoding requests are generated in every situation in the sequence. The decoding request ID (IDreq) may be used to identify the order in which the decoding requests are generated if appropriate.

The game device 1 may be a stationary game console, a portable game console, or a stationary-and-portable hybrid game console. Instead of a game device, it may be an information processing device such as a smartphone, tablet terminal, personal computer, server device in a network system, etc. Instead of one information processing device executing all of the processing, each process described above may be distributed among a plurality of information processing devices in a networking information processing system in which a plurality of devices are connected via a local or long-distance network.

The processor may be a general purpose processor or a dedicated processor. The processor may be a Microprocessor, a DSP or an ASIC etc. The processor may be implemented in part or in whole by a hardware logic.

The programs described above may be stored in advance in a non-volatile memory or may be downloaded from a server. The program may be a collection of program modules. Each program module may be stored in a different memory. Each program includes program code in a form in which the processor may directly or indirectly execute, and each program code includes instructions for processing described above.

The system program may be an OS (operating system), firmware, application programs provided by the system, applet programs, etc. The system program may be an emulator program.

Each program and/or each code described above may be executed by multiple processors. The execution order of each process described above may be changed as appropriate or may be executed in parallel. Each code described above may be included in program other than those described above. For example, the code described as being included in the game program may be included in the system program. The code described as being included in the system program may be included in the game program.

The embodiment described above was explained using an example of a game program, but the technology described herein can be applied to any application program, and is not limited to game program. Also, the embodiment described above is explained using an example of audio data, but the technology described herein can be applied to decoding any encoded source data, for example, encoded image or movie data, etc., and thus is not limited to audio data.

Processing relating to the decoding source ID described above is not necessary, and processing and data relating to the decoding source ID may be removed from the embodiments described above.

While several example systems, methods, devices, and apparatuses have been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An information processing system for enabling multiple decodable data from multiple sources to be decoded together, the information processing system comprising:

one or more processors and, one or more memories storing instructions executable by the one or more processors to perform operations comprising:

repeatedly generating a decoding request including a decoding source ID and a first buffer ID identifying a first buffer storing one unit of multiple decodable data, wherein the decodable data is audio data whose reproduction is caused in response to an audio instruction provided during execution of a game application;

in response to a decoding start instruction, obtaining the repeatedly-generated decoding requests;

for each of the obtained decoding requests, decoding the one unit of multiple decodable data stored in the first buffer identified by the first buffer ID included in the respective decoding request, storing the one unit of decoded data in a second buffer, and generating a decoding response including the decoding source ID included in the respective decoding request and a second buffer ID identifying the second buffer storing the one unit of decoded data; and after completion of decoding for the obtained decoding requests, obtaining, for a given decoding source ID, the one unit of decoded data from the second buffer identified by the second buffer ID included in the decoding response corresponding to the given decoding source ID.

2. The information processing system according to claim 1, wherein first data is further included in the decoding request lastly generated before the decoding start instruction, and the operations further comprise determining that the decoding for the obtained decoding requests has been completed with reference to the first data.

3. The information processing system according to claim 1, wherein the operations further comprise after the decoding start instruction, waiting for the completion of decoding for the obtained decoding requests, and the code for the decoding start instruction and the code for the waiting are independent from each other.

4. The information processing system according to claim 3, wherein the operations further comprise ending the waiting in response to the completion, and the ending of the waiting is executable regardless of whether the completion occurs before or after the start of the waiting.

5. The information processing system according to claim 1, wherein the operations further comprise storing past decoding information for each decoding source ID, and the decoding is configured to operate using the past decoding information for the decoding source ID included in the respective decoding requests.

6. The information processing system according to claim 5, wherein second data indicating an initialization instruction for initializing the past decoding information is further included in the decoding request, and the operations further comprise when the decoding request includes the second data indicating the initialization instruction, initializing the past decoding information for the decoding source ID included in the decoding request before or after decoding the decodable data of the decoding request.

7. The information processing system according to claim 6, wherein the initializing the past decoding information is performed before decoding the decodable data.

8. The information processing system according to claim 1, wherein the operations further comprise sorting the repeatedly-generated decoding requests by the decoding source ID included in the respective decoding requests before decoding the decodable data.

9. The information processing system according to claim 1, wherein the operations further comprise searching for an empty buffer for each generation of the decoding request, and the decodable data is stored in a buffer located by the searching.

10. The information processing system according to claim 1, wherein size data indicating the size of the decoded data is further included in the decoding response, and the obtaining of the decoded data is configured to operate based on the size data included in the respective decoding response.

11. The information processing system according to claim 1, wherein the first buffer and the second buffer are a set of buffers, which are identified by the same ID; and in the storing the decoded data, the second buffer is another buffer of the set of buffers identified by the first buffer ID included in the respective decoding request.

12. The information processing system according to claim 1, wherein the reproduction of the audio data is instructed in response to an audio event occurring during execution of the game application.

13. One or more non-transitory computer-readable storage media storing instructions for enabling multiple decodable data from multiple sources to be decoded together and are executable by one or more processors to perform operations comprising:

obtaining repeatedly-generated decoding requests each including a decoding source ID and a first buffer ID identifying a first buffer storing one unit of multiple decodable data in response to a decoding start instruction, wherein the decodable data is audio data whose reproduction is caused in response to an audio instruction provided during execution of a game application;

for each of the obtained decoding requests, decoding the one unit of multiple decodable data stored in the first buffer identified by the first buffer ID included in the respective decoding request, storing the one unit of decoded data in a second buffer, and generating a decoding response including the decoding source ID included in the respective decoding request and a second buffer ID identifying a second buffer storing the one unit of the decoded data;

determining the decoding has been completed for the obtained decoding requests; and notifying the completion of decoding for the obtained decoding requests based on the determining.

14. The one or more non-transitory computer-readable storage media according to claim 13, wherein the determination of the completion is configured to operate with reference to first data indicating the last decoding request among the obtained decoding requests included in the decoding requests.

15. The one or more non-transitory computer-readable storage media according to claim 13, wherein the operations further comprise storing past decoding information for each decoding source ID, and the decoding is configured to operate using the past decoding information for the decoding source ID included in the respective decoding requests.

16. The one or more non-transitory computer-readable storage media according to claim 15, wherein the operations further comprise initializing the past decoding information for the decoding source ID included in the decoding request before or after decoding the decodable data, based on an initialization instruction included in the decoding request.

17. The one or more non-transitory computer-readable storage media according to claim 16, wherein the initialization of the past decoding information is performed before decoding the decodable data.

18. The one or more non-transitory computer-readable storage media according to claim 13, wherein the operations further comprise sorting the obtained decoding requests by the decoding source ID included in the respective decoding requests before decoding of the decodable data.

19. The one or more non-transitory computer-readable storage media according to claim 13, wherein size data indicating the size of the decoded data is further included in the respective decoding responses.

20. The one or more non-transitory computer-readable storage media according to claim 13, wherein in the storing of the decoded data, the second buffer is a buffer of a set of buffers identified by the first buffer ID included in the respective decoding requests.

21. A computer-implemented method for enabling multiple decodable data from multiple sources to be decoded together, the method comprising:

repeatedly generating a decoding request including a decoding source ID and a first buffer ID identifying a first buffer storing one unit of multiple decodable data, wherein the decodable data is audio data whose reproduction is caused in response to an audio instruction provided during execution of a game application;

in response to a decoding start instruction, obtaining the repeatedly-generated decoding requests;

for each of the obtained decoding requests, decoding the one unit of decodable data stored in the first buffer identified by the first buffer ID included in the respective decoding request, storing the one unit of decoded data in a second buffer, and generating a decoding response including the decoding source ID included in the respective decoding request and a second buffer ID identifying the second buffer storing the one unit of decoded data; and after completion of decoding for the obtained decoding requests, obtaining, for a given decoding source ID, the decoded data from the second buffer identified by the second buffer ID included in the decoding response corresponding to the given decoding source ID.

22. The computer-implemented method according to claim 21, further comprising storing past decoding information for each decoding source ID, wherein the decoding is configured to operate using the past decoding information for the decoding source ID included in the respective decoding requests.

* * * * *